United States Patent
Nakata et al.

(10) Patent No.: US 10,650,271 B2
(45) Date of Patent: May 12, 2020

(54) IMAGE PROCESSING APPARATUS, IMAGING DEVICE, MOVING OBJECT DEVICE CONTROL SYSTEM, AND IMAGE PROCESSING METHOD

(71) Applicants: Otoichi Nakata, Kanagawa (JP); Naoki Motohashi, Kanagawa (JP); Shinichi Sumiyoshi, Kanagawa (JP)

(72) Inventors: Otoichi Nakata, Kanagawa (JP); Naoki Motohashi, Kanagawa (JP); Shinichi Sumiyoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 28 days.

(21) Appl. No.: 15/453,532

(22) Filed: Mar. 8, 2017

(65) Prior Publication Data

US 2017/0262734 A1 Sep. 14, 2017

(30) Foreign Application Priority Data

Mar. 8, 2016 (JP) .................................. 2016-044870

(51) Int. Cl.
*G06K 9/62* (2006.01)
*H04N 13/271* (2018.01)
(Continued)

(52) U.S. Cl.
CPC ........... *G06K 9/6215* (2013.01); *B60W 30/09* (2013.01); *G06K 9/00798* (2013.01); *G06K 9/00805* (2013.01); *G06K 9/00979* (2013.01); *G06K 9/6202* (2013.01); *G06T 7/593* (2017.01); *G08G 1/166* (2013.01); *H04N 13/271* (2018.05); *B60R 2300/105* (2013.01); *B60R 2300/107* (2013.01); *B60R 2300/301* (2013.01); *B60R 2300/303* (2013.01); *B60R 2300/8033* (2013.01); *B60R 2300/8093* (2013.01); *G06K 2209/40* (2013.01);
(Continued)

(58) Field of Classification Search
None
See application file for complete search history.

(56) References Cited

U.S. PATENT DOCUMENTS 7,787,712 B2 8/2010 Takahashi et al.
9,443,294 B2 9/2016 Sumiyoshi et al.
(Continued)

FOREIGN PATENT DOCUMENTS

| EP | 2767927 | 8/2014 |
| JP | 2001-227944 | 8/2001 |
| JP | 2014-225220 | 12/2014 |

OTHER PUBLICATIONS

Office Action dated Jan. 14, 2020 in Japanese Application No. 2016-044870, filed Mar. 8, 2016.

*Primary Examiner* — Matthew C Bella
*Assistant Examiner* — Brian D Shin
(74) *Attorney, Agent, or Firm* — Oblon, McClelland, Maier & Neustadt, L.L.P.

(57) ABSTRACT

An image processing apparatus includes a processor configured to generate vertical direction distribution data which is a distribution of distance values to a vertical direction of a distance image from the distance image having distance values according to distance of a road surface in captured images. There is an extraction of a pixel having the highest frequency value for each of the distance values from pixels in a search area. There is a detection of the road surface based on each pixel extracted.

7 Claims, 12 Drawing Sheets

(51) Int. Cl.
  *G06K 9/00*    (2006.01)
  *G06T 7/593*   (2017.01)
  *B60W 30/09*   (2012.01)
  *G08G 1/16*    (2006.01)
  *H04N 13/00*   (2018.01)

(52) U.S. Cl.
  CPC .............. *H04N 2013/0081* (2013.01); *H04N 2013/0092* (2013.01)

(56) References Cited

U.S. PATENT DOCUMENTS

| | | |
|---|---|---|
| 2007/0195070 A1 | 8/2007 | Takahashi et al. |
| 2007/0195370 A1 | 8/2007 | Suga et al. |
| 2013/0057707 A1 | 3/2013 | Hasegawa et al. |
| 2015/0294160 A1 | 10/2015 | Takahashi et al. |
| 2016/0014406 A1 | 1/2016 | Takahashi |
| 2016/0019429 A1 | 1/2016 | Ishigaki |
| 2016/0253575 A1 | 9/2016 | Takegawa et al. |

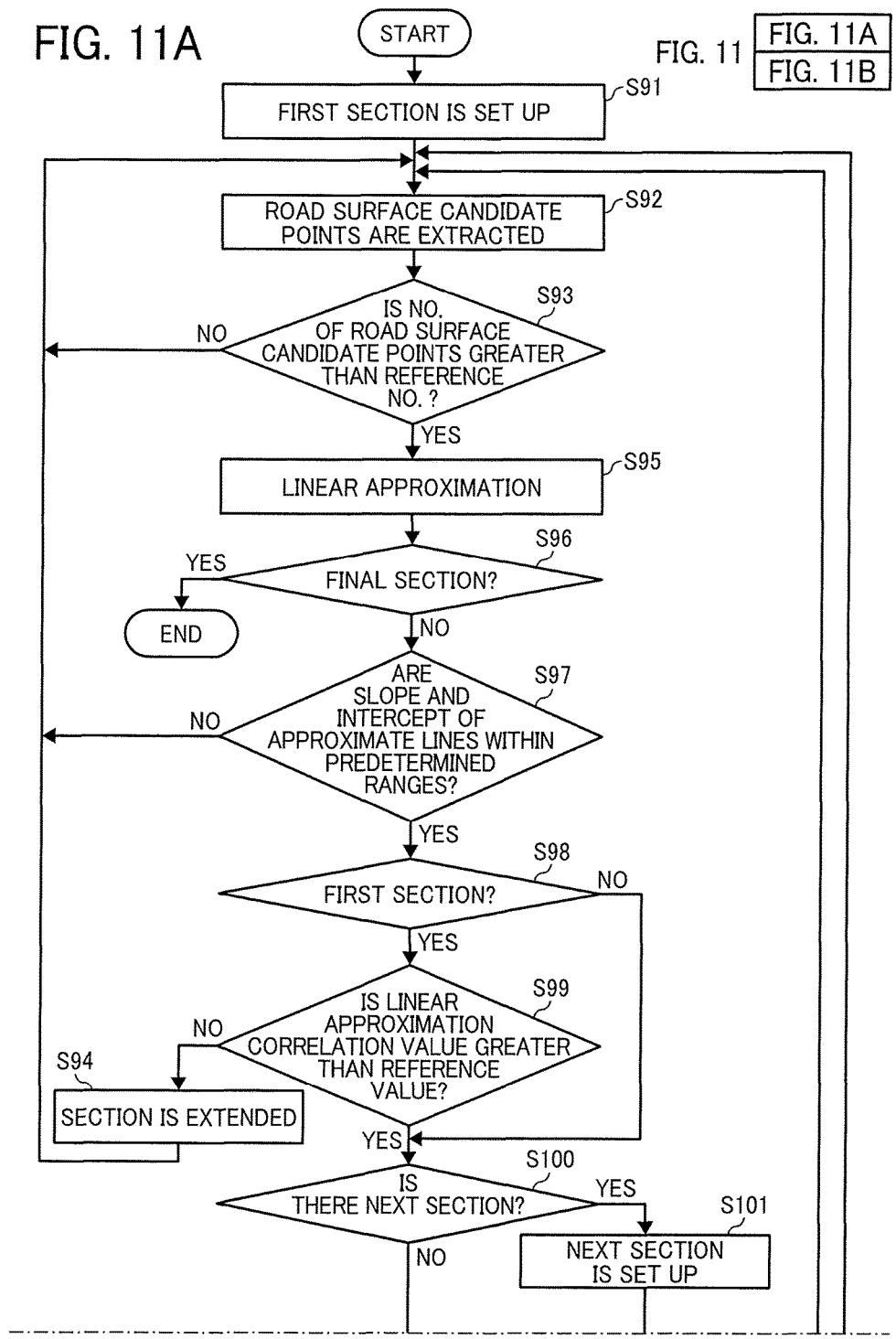

IMAGE PROCESSING APPARATUS, IMAGING DEVICE, MOVING OBJECT DEVICE CONTROL SYSTEM, AND IMAGE PROCESSING METHOD

CROSS-REFERENCE TO RELATED APPLICATIONS

The present application is based upon and claims the benefit of priority of Japanese Patent Application No. 2016-044870, filed on Mar. 8, 2016, the contents of which are incorporated herein by reference in their entirety. This application is related to U.S. patent application Ser. No. 15/334,869, filed Oct. 26, 2016, the contents of which are incorporated herein by reference.

BACKGROUND OF THE INVENTION

1. Field of the Invention

The present disclosure relates to an image processing apparatus, an imaging device, a moving object device control system, and an image processing method.

2. Description of the Related Art

Conventionally, the development of a body structure of an automotive vehicle was carried out for the purpose of promoting the safety and protection of vehicle occupants or pedestrians when the vehicle collides with another vehicle or an obstruction. In recent years, however, with the advance in information processing and image processing technologies, a technique for speedily detecting other people and vehicles in front of an automotive vehicle has been developed. An automotive vehicle incorporating an automatic braking system has already come on the market, which utilizes the above technique to automatically put on brakes on the vehicle before collision and autonomously prevent the vehicle from colliding with people and other vehicles.

In order to automatically put on the brakes of the vehicle, performing measurement of other people and vehicles in front of the vehicle with a high level of accuracy is needed. A technique for performing measurement using images obtained from a stereo camera is practically utilized. Further, there is a related art technique using images obtained from a stereo camera for recognizing a human and an object like a car by performing image processing. For example, see Japanese Patent Publication No. 2015-075800.

First, a V-Disparity image is generated from some images obtained from a stereo camera. One axis of the V-Disparity image is a vertical direction coordinate of an image obtained from a stereo camera. The other axis of the V-Disparity image is disparity of images obtained from a stereo camera. A pixel value of the V-Disparity image is a frequency of disparity. Next, a road surface is detected from the V-Disparity image generated. A U-Disparity image is generated by using the detected road surface. A vertical axis of the U-Disparity image is a horizontal direction of an image obtained from a stereo camera. A horizontal axis of the U-Disparity image is disparity of an image obtained from a stereo camera. A pixel value of the U-Disparity image is a frequency of disparity of an object which exists on a higher position than a road surface. Then, a human and an object like a car are recognized based on the U-Disparity image which has been generated.

SUMMARY

In one embodiment, the present disclosure provides an image processing apparatus including a processor configured to generate vertical direction distribution data which is a distribution of distance values vertical to a direction of a distance image from the distance image having distance values according to distance of a road surface in some captured images obtained by imaging units. The processor extracts a pixel having the highest frequency value for each distance value from pixels in a search area. The apparatus detects the road surface based on each pixel detected.

The objects and advantages of the invention will be implemented and attained by unit of the elements and combinations particularly pointed out in the claims. It is to be understood that both the foregoing general description and the following detailed description are exemplary and explanatory and are not restrictive of the invention as claimed.

BRIEF DESCRIPTION OF THE DRAWINGS

FIG. 11A and FIG. 11B are flowcharts for explaining a division linear approximation process.

DETAILED DESCRIPTION OF THE PREFERRED EMBODIMENTS

In one aspect, the present disclosure provides a technique for increasing the accuracy of the road surface detection.

In the following, a moving object device control system including an image processing apparatus according to an embodiment will be described with reference to the accompanying drawings.

Figure 1:
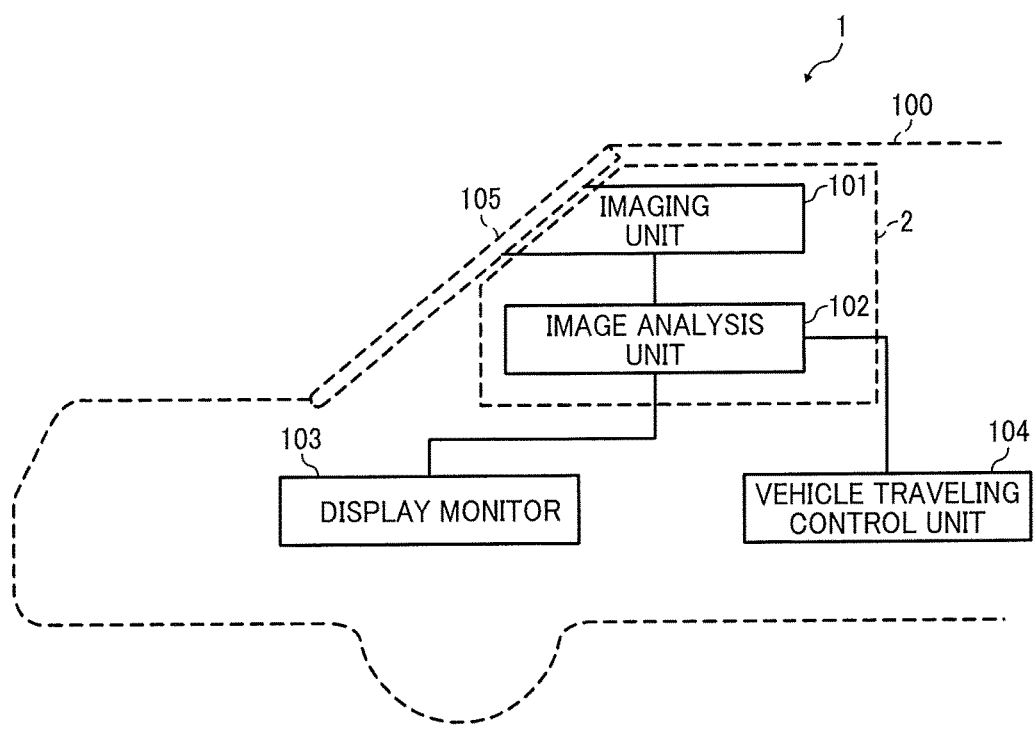
FIG. 1 is a diagram illustrating a configuration of an in-vehicle device control system which is a moving object device control system according to an embodiment.

FIG. 1 illustrates a configuration of an in-vehicle device control system 1 which is an example of the moving object device control system according to the embodiment.

The in-vehicle device control system 1 is mounted on an automotive vehicle 100. In the following, the vehicle 100 may also be referred to as a moving object. As illustrated in FIG. 1, the in-vehicle device control system 1 includes an imaging unit 101, an image analysis unit 102, a display monitor 103, and a vehicle traveling control unit 104.

The imaging unit 101 detects relative height information (indicating a relative inclination condition) of a traveling road surface (moving surface) in front of the vehicle 100 based on captured image data obtained by capturing an image of a forward area (imaging area) of the vehicle 100 in a vehicle traveling direction, detects a 3-D (three-dimensional) profile of the traveling road surface in front of the vehicle 100 based on the detected relative height information, and performs control of the vehicle 100 (the moving object) or another in-vehicle device by utilizing the detected 3-D profile. The control of the moving object may include sending a notification of warning, controlling a steering wheel of the vehicle 100 (the moving object), and controlling the brakes on the vehicle 100 (the moving object).

The imaging unit 101 may be disposed in a vicinity of a mirror of a windshield 105 of the vehicle 100. Various data including the captured image data obtained by capturing images by the imaging unit 101 is input to the image analysis unit 102. The image analysis unit 102 serves as an image processing unit. The image analysis unit 102 analyzes the data received from the imaging unit 101, detects a relative height (position information) of each of respective points on the traveling road surface in front of the vehicle 100 to the road surface portion (located directly below the vehicle 100) on which the vehicle 100 is running, and recognizes the 3-D (three-dimensional) profile of the traveling road surface in front of the vehicle 100. Additionally the image analysis unit 102 recognizes objects, such as preceding vehicles, and pedestrians or obstacles in front of the vehicle 100.

The result of the analysis output from the image analysis unit 102 is transmitted to each of the display monitor 103 and the vehicle traveling control unit 104. The captured image data obtained by the imaging unit 101 and the result of the analysis output from the image analysis unit 102 are displayed on the display monitor 103. The vehicle traveling control unit 104 performs traveling support control of the vehicle 100 and sends a notification of warning to the driver of the vehicle 100.

Figure 2:
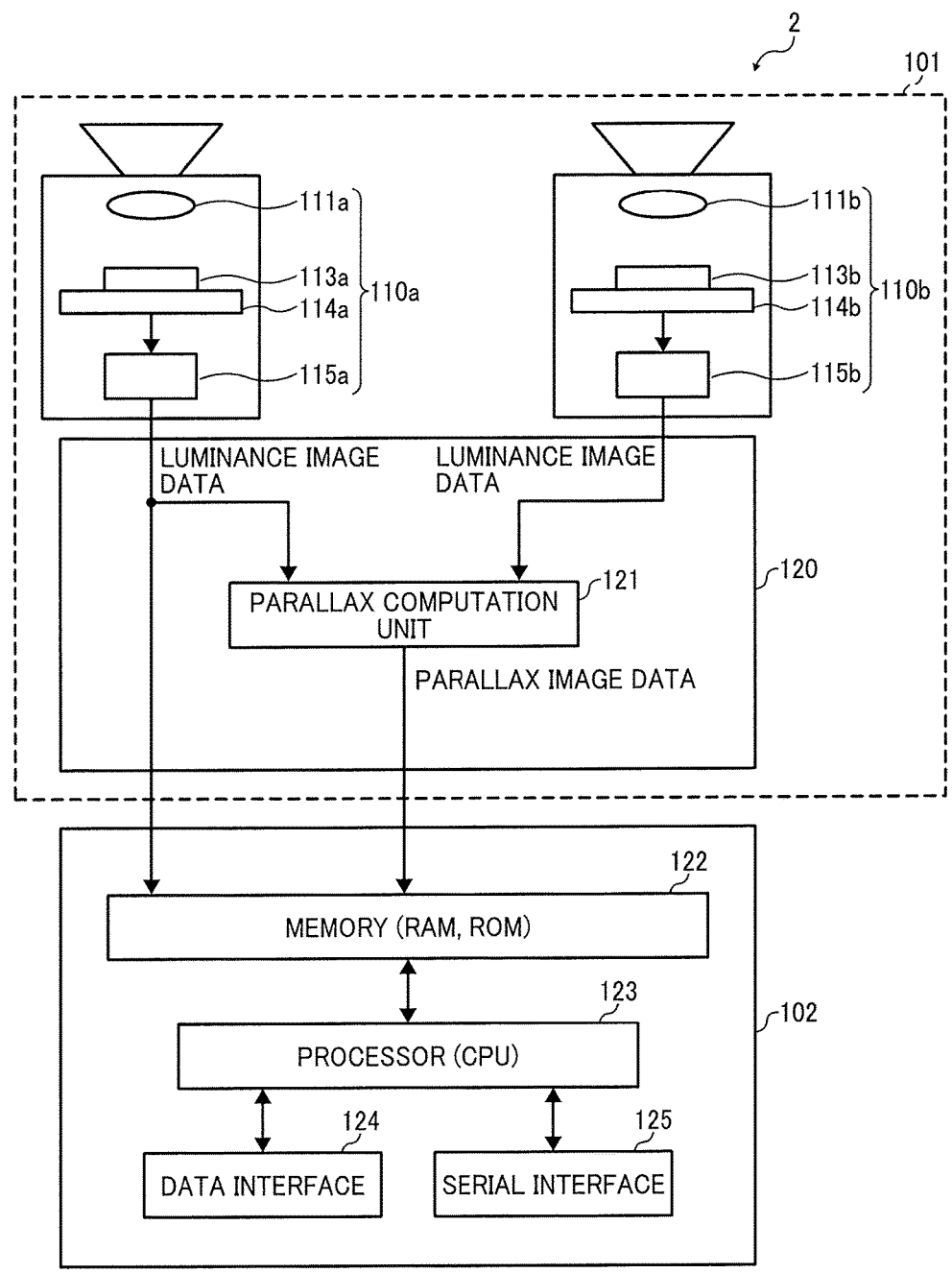
FIG. 2 is a diagram illustrating a configuration of an imaging unit and an image analysis unit.

FIG. 2 illustrates a configuration of the imaging unit 101 and the image analysis unit 102.

As illustrated in FIG. 2, the imaging unit 101 includes a stereo camera having a pair of imaging portions 110a and 110b (each of which is an image capturing unit). The imaging portion 110a includes an imaging lens 111a, an image sensor 113a in which photodetectors are arrayed in a two-dimensional formation, a sensor board 114a on which the image sensor 113a is mounted, and a signal processor 115a. The signal processor 115a converts an analog signal from the sensor board 114a (which signal is an electric signal indicating the light receiving amount of the photodetectors on the image sensor 113a) into a digital signal, and generates the captured image data from the digital signal. The elements 111b, 113b, 114b, 115b of the imaging portion 110b are essentially the same as the elements 111a, 113a, 114a, 115a of the imaging portion 110a described above, and a description thereof will be omitted. The imaging unit 101 is configured to output luminance image data and parallax image data.

The imaging unit 101 further includes a processing hardware unit 120 which is implemented by a field-programmable gate array (FPGA), Application Specific Integrated Circuit (ASIC), a microprocessor, and/or a microprocessor or combination thereof or the like. The processing hardware unit 120 includes a parallax computation unit 121 which is a parallax image information generation unit configured to compute a parallax value of a correspondence image portion between the captured images obtained by the imaging units 110a and 110b, in order to obtain a parallax image from the luminance image data output from the imaging units 110a and 110b.

Here, one of the captured images obtained by the imaging units 110a and 110b is regarded as a reference image and the other captured image is regarded as a comparison image. An amount of deviation of an image portion in the comparison image from an image portion in the reference image, both the image portions corresponding to a same point in the imaging area, is computed as the parallax value of the correspondence image portion. By utilizing the principle of triangulation, a distance to the same point in the imaging area corresponding to the image portion may be computed based on the parallax value of the correspondence image portion.

The image analysis unit 102 includes a memory unit 122 which stores the luminance image data and the parallax image data output from the imaging unit 101. The memory unit 122 is disposed on an image processing board and/or implemented by a read-only memory (ROM) and a random access memory (RAM). The image analysis unit 102 further includes a processor 123, a data interface 124, and a serial interface 125. The processor 123 is implemented by a central processing unit (CPU) or microprocessor which is configured to execute a computer program stored in the memory unit 122 for performing an object recognition process and a parallax computation control.

The FPGA which implements the processing hardware unit 120 is configured to perform processes which require real-time processing of image data, such as gamma correction and distortion correction (collimation of left and right captured images), and configured to perform parallax computation by block matching, so that parallax image information is generated and the parallax image information is stored in the RAM of the image analysis unit 102. The processor (CPU) 123 of the image analysis unit 102 is configured to control overall operations of the image sensor controllers of the imaging units 110a and 110b and overall operations of the image processing board. Further, the processor (CPU) 123 of the image analysis unit 102 is configured to perform various processes based on the computer programs read from the ROM, including a 3-D profile detection process related to a road surface and an object detection process related to a guardrail or the like (target object), by receiving the luminance image data and the parallax image data from the RAM as the input data, and configured to output the results of the processes to an external device via the data interface 124 or the serial interface 125. The processor (CPU) 123 of the image analysis unit 102 may be configured to receive, when the above processes are performed, vehicle performance information, including a steering angle, a yaw rate, an acceleration (mainly a forward/backward acceleration), and a vehicle speed of the vehicle 100, by means of the data interface 124, and use the vehicle performance information as a parameter of the above processes. The data output to the external device is used by the external device as input data for controlling the in-vehicle devices of the vehicle 100 (brake control, speed control, warning control).

Note that the imaging unit 101 and the image analysis unit 102 may be configured as a single imaging device 2, if desired.

Figure 3:
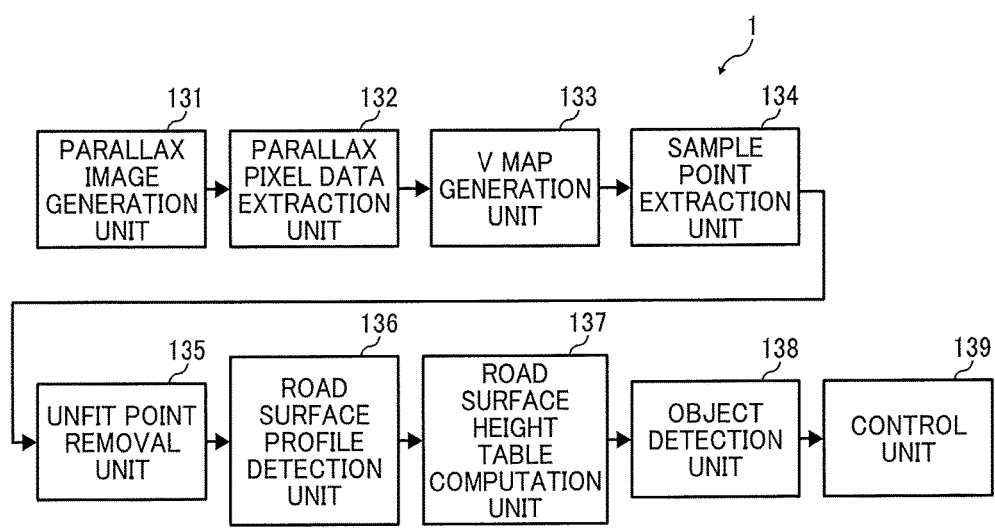
FIG. 3 is a block diagram illustrating a functional configuration of a moving object device control system.

FIG. 3 is a block diagram illustrating a functional configuration of an in-vehicle device control system 1 using the processing hardware unit 120, the image analysis unit 102 in FIG. 2 and the vehicle traveling control unit 104 in FIG. 1. A functional unit realized by the image analysis unit 102 is realized by processes that one or more programs installed in the image analysis unit 102 cause the CPU 123 at the image analysis unit 102 to perform.

In the following, the process according to this embodiment will be described.

[Parallax Image Generation Process]

A parallax image generation unit 131 which is implemented by the parallax computation unit 121 (FIG. 2) is configured to perform a parallax image generation process, so that the parallax image data (parallax image information) is generated. In the parallax image generation process, the luminance image data of the imaging unit 110a that is one of the imaging units 110a and 110b is regarded as reference image data, and the luminance image data of the imaging unit 110b that is the other imaging unit is regarded as comparison image data. In the parallax image generation process, parallax values between the comparison image data and the reference image data are computed, and parallax image data are generated and output. The parallax image data indicate a parallax image in which a pixel value according to the parallax value d computed with respect to each of image portions of the reference image data is represented as a pixel value of the corresponding image portion.

Specifically, the parallax image generation unit 131 determines a block of several pixels (e.g., 16×1 pixels) where a pixel of interest is included as a central pixel of the block, with respect to a line of the reference image data. The parallax image generation unit 131 computes a correlation value indicating correlation between a feature amount indicating a feature of the pixel values of each block of the comparison image data and a feature amount indicating a feature of the pixel values of the block of the reference image data each time the block of the comparison image data at the same line and with the same size as the block of the reference image data is shifted in the horizontal direction (x direction) by one pixel. The parallax image generation unit 131 performs a matching process to select one of the blocks of the comparison image data whose feature value is most correlated with the feature amount of the block of the reference image data, based on the computed correlation values. Then, the parallax image generation unit 131 computes, as the parallax value d, an amount of deviation between the pixel of interest of the block of the reference image data and the corresponding pixel of the block of the comparison image data selected by the matching process. The parallax image generation unit 131 obtains the parallax image data by performing the process of computing the parallax value d repeatedly for the whole area or a particular area of the reference image data.

For example, the luminance values of the pixels included in the block may be used as the feature amount of the block for the matching process, and a sum of the absolute values of differences between the luminance values of the pixels of the block of the reference image data and the luminance values of the corresponding pixels of the block of the comparison image data may be used as the correlation value.

In this case, the block with the smallest sum of the absolute values of the differences is determined as the most correlated one.

When the matching process by the parallax image generation unit 132 is performed by hardware processing, any one of the known techniques, including SSD (Sum of Squared Difference), ZSSD (Zero-mean Sum of Squared Difference), SAD (Sum of Absolute Difference), and ZSAD (Zero-mean Sum of Absolute Difference), may be utilized. Note that only the parallax value per pixel may be computed by the matching process, and if a sub pixel level parallax value (which is less than one pixel level parallax value) is required, it is necessary to use an estimated parallax value. As a process for estimating a sub pixel level parallax value, an isometric straight line fitting process or a quadratic curve fitting process may be utilized.

[Parallax Pixel Data Extraction Process]

Figure 4:
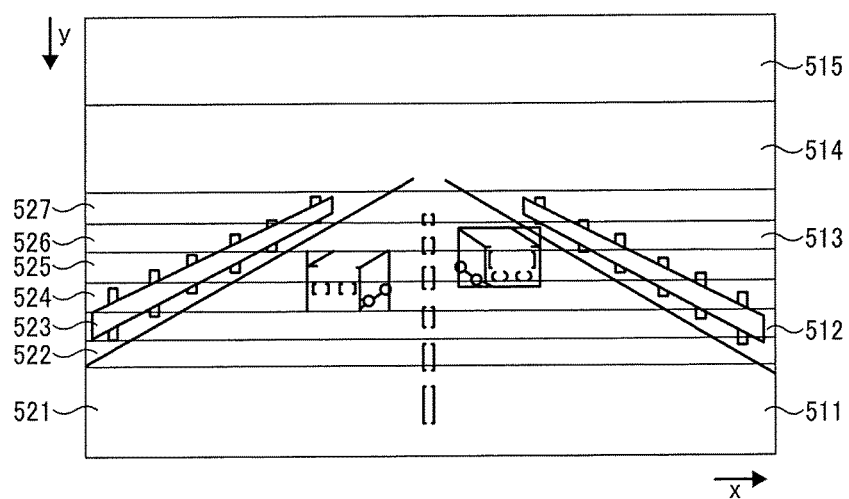
FIG. 4 is a diagram illustrating a parallax pixel data extraction process.

Next, a parallax pixel data extraction unit 132 will be described with reference to FIG. 4. FIG. 4 is a diagram for explaining a parallax pixel data extraction process.

The parallax pixel data extraction unit 132 is configured to receive the parallax image data generated by the parallax image generation unit 131, and extract from predetermined areas of the parallax image a group (x, y, d) of the x-axis direction position x, the y-axis direction position y of each parallax pixel data included in the parallax image data, and the parallax value d.

In the example of FIG. 4, the parallax image data is divided at equal intervals into five areas (which are designated by the reference numerals 511 to 515 sequentially in the direction from bottom to top). Additionally, the area 511 is a segment 521. The area 512 is divided into a segment 522, a segment 523 and a segment 524. The area 513 is divided into a segment 525, a segment 526 and a segment 527.

In the example of FIG. 4, the segment 521 having high importance is larger than the segment 522-527 having low importance because amount of change one pixel has is larger as the pixel is closer to a vanishing point of a stereo camera. Note that the parallax pixel data extraction unit 132 may change each segment's size dynamically when a slope is detected.

The parallax pixel data extraction unit 132 extracts parallax pixel data from each segments and outputs the parallax pixel data to the sample point extract unit 134. The V map generating process and the sample point extract process are performed in each segment. The in-vehicle device control system 1 is able to perform the road surface detection process which is resistant to a noise of distance direction (d direction) by performing a process at each vertical segments because the road surface is more far from vehicle 100 as the road surface exist on the upper position (Y direction) in the parallax image.

[V Map Generation Processing]

A V map generation unit 133 is configured to perform a V map generation process so that a V map (V-Disparity Map, an example of 'perpendicular or vertical direction distribution data') is generated based on parallax pixel data extracted by the parallax pixel data extraction unit 132. Each of pixel data items included in the parallax image data is represented by a group (x, y, d) of an x-axis direction position x, a y-axis direction position y, and a parallax value d. Parallax histogram information is generated by transforming each pixel data item (x, y, d) of the parallax image data into three-dimensional coordinate information (d, y, f) where d is assigned to the x-axis, y is assigned to the y-axis, and a frequency f is assigned to the z-axis, or two-dimensional coordinate information (d, y, f) which is restricted from the three-dimensional-coordinate information (d, y, f) to the information which exceeds a predetermined frequency threshold. In this embodiment, the parallax histogram information includes the three-dimensional-coordinate information (d, y, f), and a map in which the three-dimensional histogram information is distributed in the X-Y two-dimensional coordinate system will be referred to as a V map (a parallax histogram map or a V-disparity map).

Specifically, the V map generation unit 133 is configured to compute a parallax value frequency distribution for each of line areas of the parallax image data which are obtained by dividing the image into image portions in the up/down direction. The parallax histogram information is the information indicating the parallax value frequency distribution computed by the V map generation unit 133.

Figure 5A:
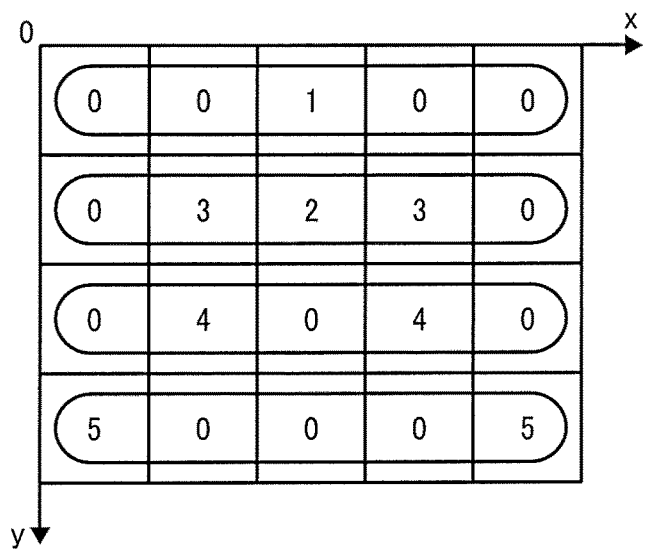
FIG. 5A and FIG. 5B are diagrams for explaining parallax image data and a V map generated from the parallax image data.
Figure 5B:
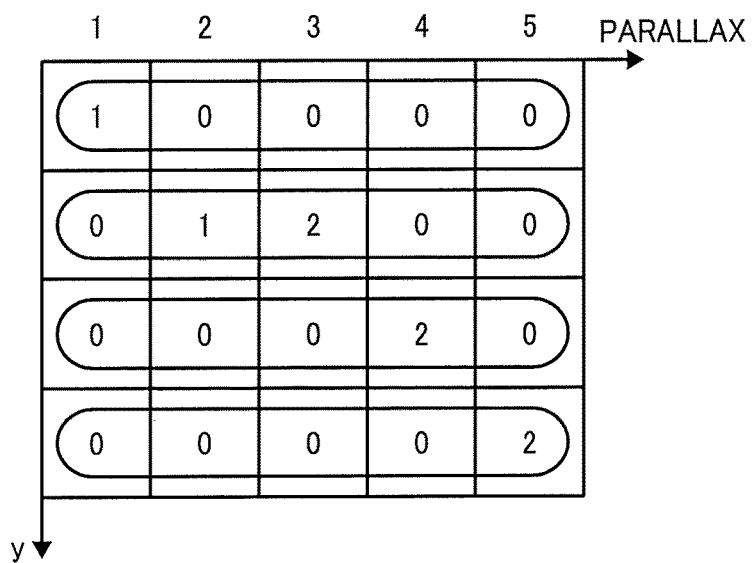

FIG. 5A and FIG. 5B are diagrams for explaining the parallax image data and the V map generated from the parallax image data. FIG. 5A illustrates an example of a parallax value distribution of a parallax image, and FIG. 5B illustrates the V map which indicates a parallax value frequency distribution for each of the lines of the parallax image illustrated in FIG. 5A.

When the parallax image data having the parallax value distribution as illustrated in FIG. 5A is received, the V map generation unit 133 computes a parallax value frequency distribution which indicates a distribution of the number of data items of the parallax value for each of the lines, and outputs this parallax value frequency distribution as the parallax histogram information. The information of the parallax value frequency distribution computed for each of the lines is expressed in the two-dimensional rectangular coordinate system where the position in the y-axis direction of the parallax image (or the position in the up/down direction of the captured image) is assigned to the y-axis and the parallax value is assigned to the x-axis. In this way, the V map as illustrated in FIG. 5B can be obtained. This V map may also be expressed as an image in which pixels each having a pixel value according to the frequency f are distributed in the two-dimensional rectangular coordinate system.

Figure 6A:
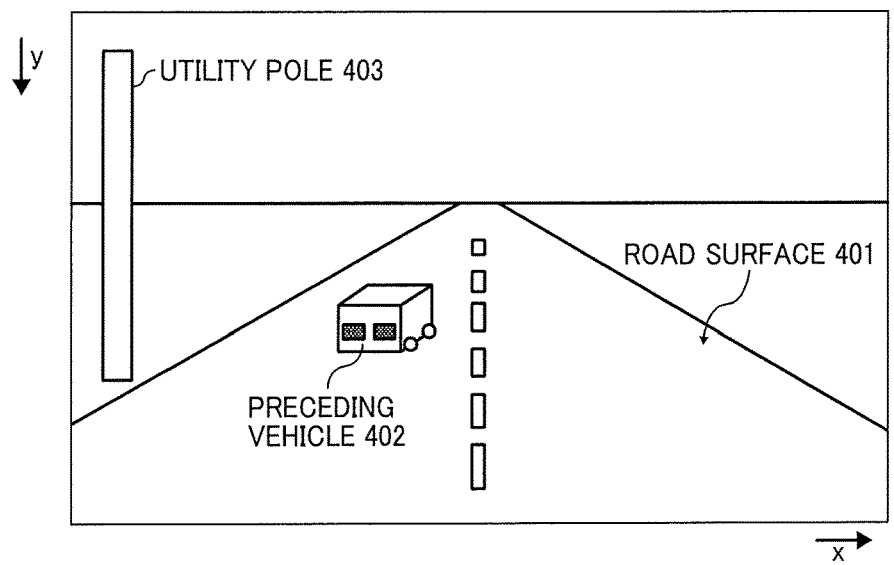
FIG. 6A is a diagram illustrating an example of a captured image obtained as a reference image by an imaging unit.
Figure 6B:
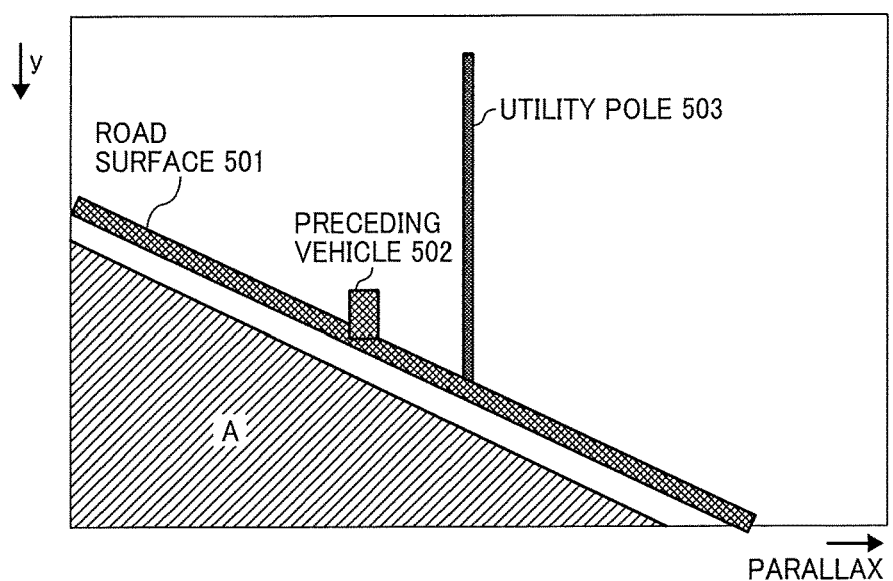
FIG. 6B is a diagram illustrating a V map corresponding to the captured image.

FIG. 6A and FIG. 6B are diagrams illustrating an example of a captured image obtained as a reference image by one of the imaging units, and a V map generated from the captured image. FIG. 6A illustrates the captured image, and FIG. 6B illustrates the V map. The V map illustrated in FIG. 6B is generated based on the captured image illustrated in FIG. 6A. The parallax is not detected from an area below a road surface 501, and, in the shaded area A of the V map indicated in FIG. 6B, the parallax value is not counted.

In the image example of FIG. 6A, the road surface 401 on which the vehicle is running, a preceding vehicle 402 existing ahead of the vehicle, and an electric pole 403 existing outside the road surface 401 are indicated. In the V map illustrated in FIG. 6B, a road surface 501, a preceding vehicle 502, and an electric pole 503, which correspond to the elements of the image example, are indicated.

The image example is obtained in a case where the road surface in front of the vehicle is a flat road surface (i.e., the road surface in front of the vehicle is consistent with a virtual reference road surface (virtual reference moving surface) obtained by extending in the vehicle forward direction a road surface parallel to a road surface portion directly below the vehicle). In this case, the points with a high frequency in the lower portion of the V map corresponding to the lower portion of the image are distributed along an approximately straight line having an inclination to decrease the parallax value toward the upper portion of the image. It can be understood that the pixels indicating the above distribution are obtained when an image of a target object existing substantially at the same distance in each of the lines of the parallax image and having the highest occupancy with the distance continuously increasing toward the upper portion of the image is captured.

The imaging unit 110a captures an image in the front area of the vehicle, and the content of the captured image indicates that the parallax value of the road surface decreases toward the upper portion of the image, as illustrated in FIG. 6A. Moreover, the pixels indicating the road surface have the same parallax value in the same line (horizontal line). Hence, the points with a high frequency being distributed along the approximately straight line in the V map correspond to the feature of the pixels indicating the road surface (the moving surface). Thus, the pixels of the points distributed on an approximate line obtained by performing linear approximation of the points with a high frequency of the V map or existing in the vicinity of the approximate line can be estimated with a high level of accuracy as the pixels indicating the road surface. Further, the distance to the road surface portion indicated by the pixels can be determined with a high level of accuracy based on the parallax value of the corresponding point on the approximate line.

[Sample Point Extraction Process]

The sample point extraction unit 134 sets a search area for searching for a sample point for each distance value in the V map generated by the V map generation unit 133. For example, for each distance area, the sample point extraction unit 134 sets a search area having a width according to distance values, including one of each distance value having a higher value than a predetermined value as the one of the each distance value and having predetermined height from the lowest pixel in the vertical direction. Then, the sample point extract unit 134 extract a pixel having the biggest pixel value (the most frequently occurring point) as the sample point from pixels in the search area.

Figure 7:
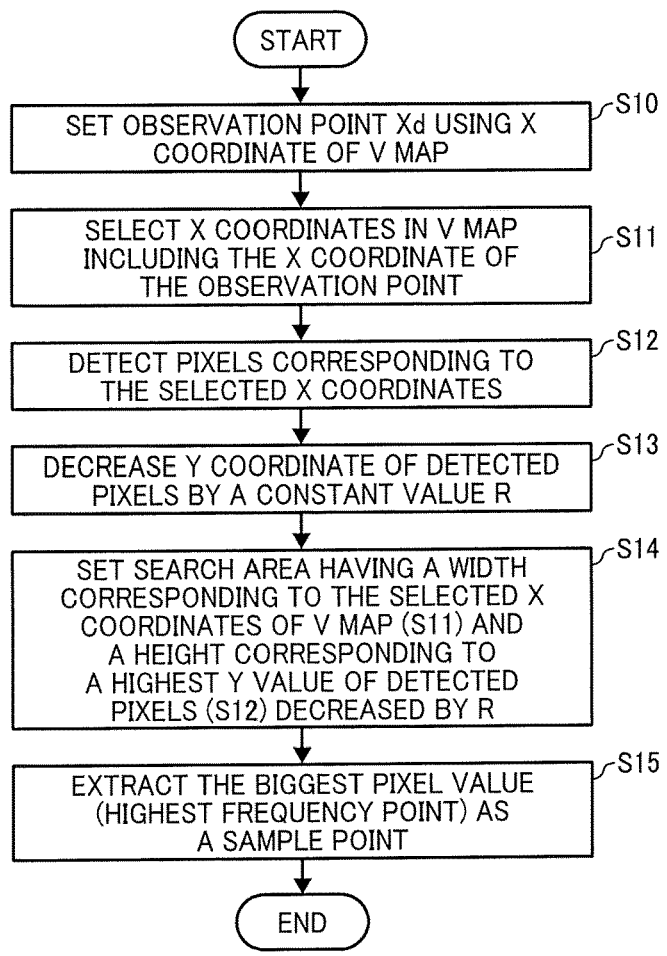
FIG. 7 is a flowchart for explaining an example of a sample point extraction process.
Figure 8:
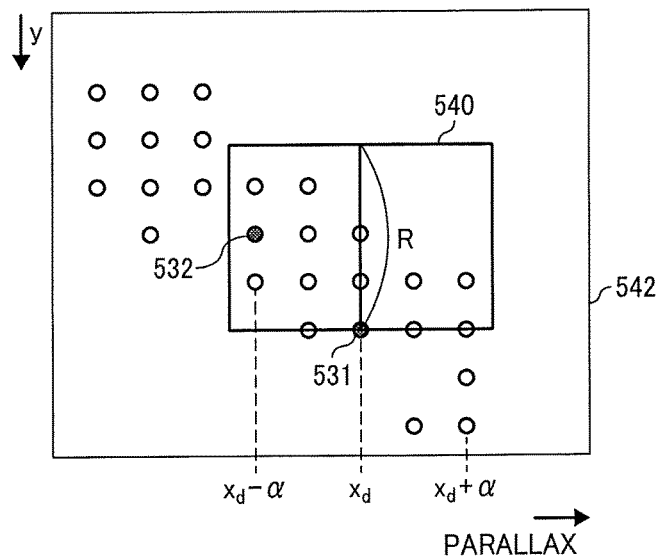
FIG. 8 is a diagram illustrating a sample point extraction process.

Next, a sample point extraction process performed by the sample point extraction unit 134 will be described with reference to FIG. 7 and FIG. 8. FIG. 7 is a flowchart for explaining the sample point extraction process. FIG. 8 is a diagram for explaining the sample point extraction process. In FIG. 8, 542 designates the V map.

First, the sample point extraction unit 134 sets an observation point Xd using an X coordinate of the V map generated by the V map generation unit 133 (STEP S10).

Next, the sample point extraction unit 134 selects X coordinates including the X coordinate of the observation point Xd (for example, between Xd−α and Xd+α) (STEP S11). For example, the sample point extraction unit 134 may select between Xd and Xd+α as the X coordinates including the sample point Xd. Alternatively, the sample point extraction unit 134 may select between Xd−2α and Xd+2α which and skip every other pixel as an extraction area, where 'α' is an integer number, for example, 'α' is 2, 3 or 4. Thus, according to one implementation, α is an integer greater than or equal to 2.

Next, the sample point extraction unit 134 scans pixel values at the next line above of the parallax image by changing a value of the coordinate on the Y axis, detects a pixel (a vote data) having a value (the pixel value is not 0) (STEP S12). In the example of FIG. 8, a pixel 531 having a value is detected at the X coordinate of sample point Xd at S12 in FIG. 7.

Next, the sample point extraction unit 134 calculates a value which is obtained by decreasing a value of the coordinate on the Y axis of the pixel having a value by a predetermined constant number R (for example, R is 60) (STEP S13). The value of R is set to a value according to a past performance of a stereo camera and the environment. The reason for decreasing by the constant number R is that top left is the origin (0, 0) in the parallax image and the V map.

Next, the sample point extraction unit 134 sets a searching area 540 having a lateral direction range (width) which is according to some X coordinates set at STEP S11 and a longitudinal direction range (height) which Is from a value of the coordinate on the Y axis detected at STEP S12 to a value (y-R) calculated at STEP S13 (STEP S14).

Next, the sample point extraction unit 134 extracts a pixel having the biggest pixel value (the highest frequency point) in the searching area 540 (STEP S15). In the example in the FIG. 8, the sample point extraction unit 134 extracts the most frequent point 532 as a sample point in a range between a value of y coordinate of pixel 531 and height y-R and a range of width having some X coordinates including the observation point Xd.

In the V map's X coordinate predetermined range according to each segment, the sample point extraction unit 134 performs the above process by changing a value of the observation point Xd.

[Unfit Point Removal Process]

Unfit point removal unit 135 removes an unfit point for an approximate line in sample points extracted by the sample point extraction unit 134.

Figure 9:
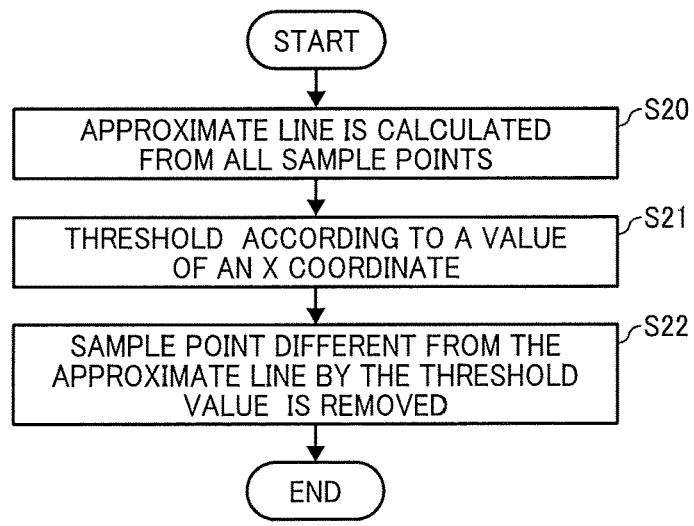
FIG. 9 is a flowchart for explaining an example of a sample point extraction process.
Figure 10:
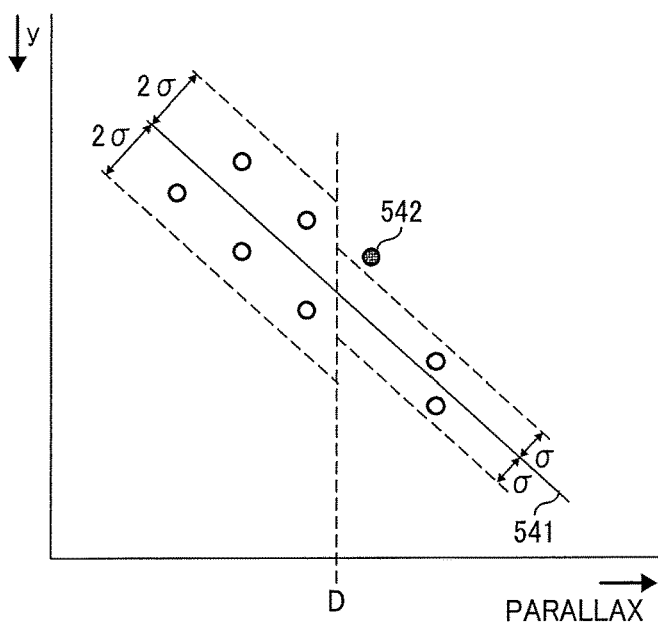
FIG. 10 is a diagram illustrating an unfit point removal process.

An unfit point removal process by the unfit point removal unit 135 will be described with reference to FIG. 9 and FIG. 10. FIG. 9 is a flowchart for explaining the unfit point removal process. FIG. 8 is a diagram for explaining the unfit point removal process.

First, the unfit point removal unit 135 calculates an approximate line by using all sample points extracted by the sample point extracted unit 134 (all sample points extracted from each V map according to each segment 521-527 in the FIG. 4) (STEP S20). For example, the unfit point removal unit 135 calculates an approximate line using a least-squares method. In the example of FIG. 10, an approximate line 541 is calculated by STEP S20 in FIG. 9.

Next, the unfit removal point unit 135 calculates a threshold according to a value of the coordinate on the X axis (STEP S21). In the example of FIG. 10, a predetermined value D (for example, a parallax value corresponds to a 50 meter distance from the vehicle 100) of the coordinate on the X axis is a boundary value. In the case of the value of the coordinate on the X axis being smaller than D (far from predetermined distance from the vehicle 100), the predetermined threshold is 2 σ (sigma). In the case of the value of the coordinate on the X axis being greater than or equal to D (near from predetermined distance from the vehicle 100), the predetermined threshold is σ. This is to make the threshold large. Because a location having a small parallax value of a road surface which is far from the vehicle 100 makes the error large.

Next, the unfit point removal unit 135 removes a sample point having a Euclidean distance of the threshold or more calculated at STEP S21 from the approximate line calculated (STEP S22). In the example of FIG. 10, the unfit point removal unit 135 removes a sample point 542 having Euclidean distance of the threshold σ or more and a value of the coordinate on the X axis is greater than or equal to D.

[Road Surface Profile Detection Process]

The road surface profile detection unit 136 detects a road surface profile (position, height) based on the V map (amended V map) which is extracted sample points which have been extracted by the sample point extraction unit 134 after the unfit points have been removed by the unfit point removal unit 135.

When the road surface is a flat surface, an approximate line can be obtained by linear approximation with good accuracy. However, when the road surface has an inclination that is varied in the vehicle traveling direction, it is difficult to obtain an approximate line by linear approximation with good accuracy. Hence, in this embodiment, the V map information is divided into two or more parallax value sections according to the parallax value, and linear approximation is performed for each of the parallax value sections.

Figure 11B:
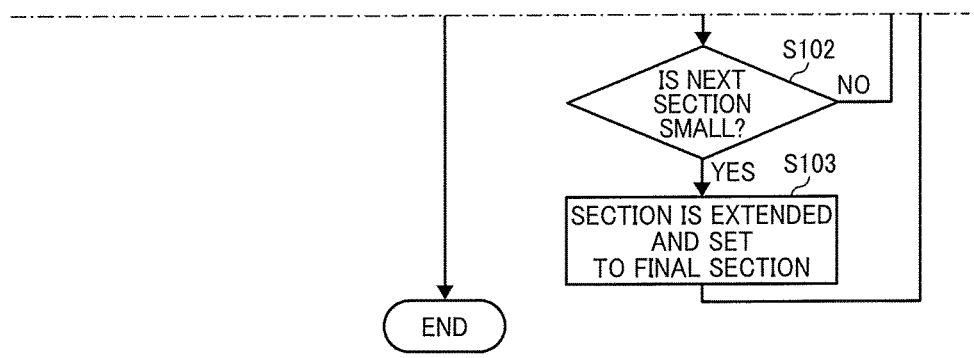
Figure 12A:
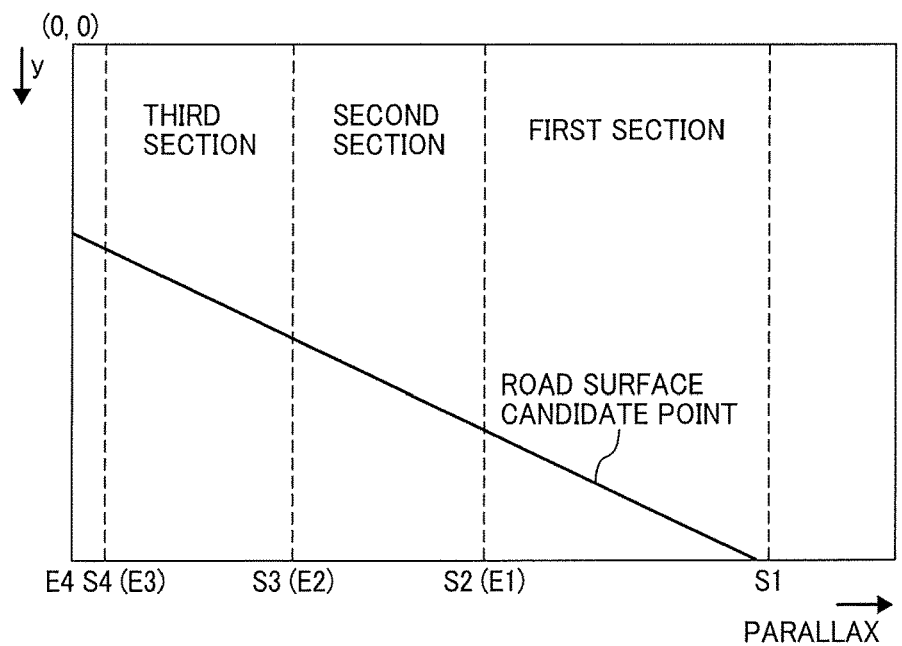
FIG. 12A and FIG. 12B are diagrams illustrating original sections and sections after the original first section is extended.
Figure 12B:
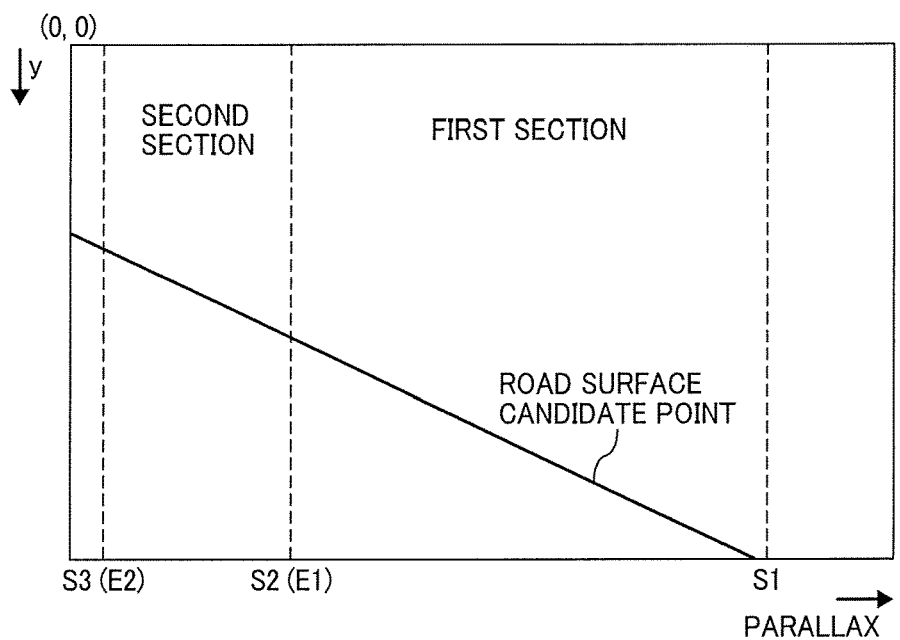
Figure 13A:
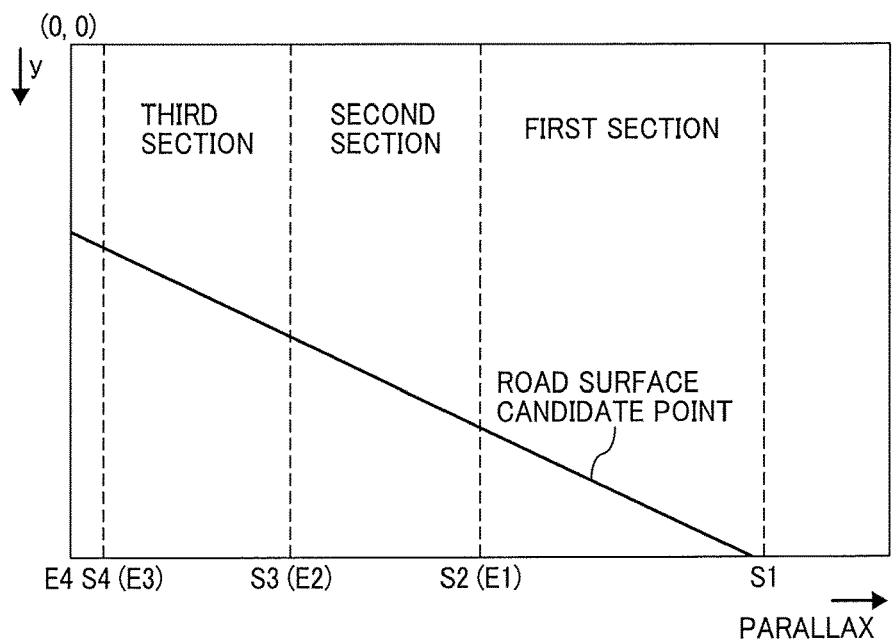
FIG. 13A and FIG. 13B are diagrams illustrating original sections and sections after the original second section is extended.
Figure 13B:
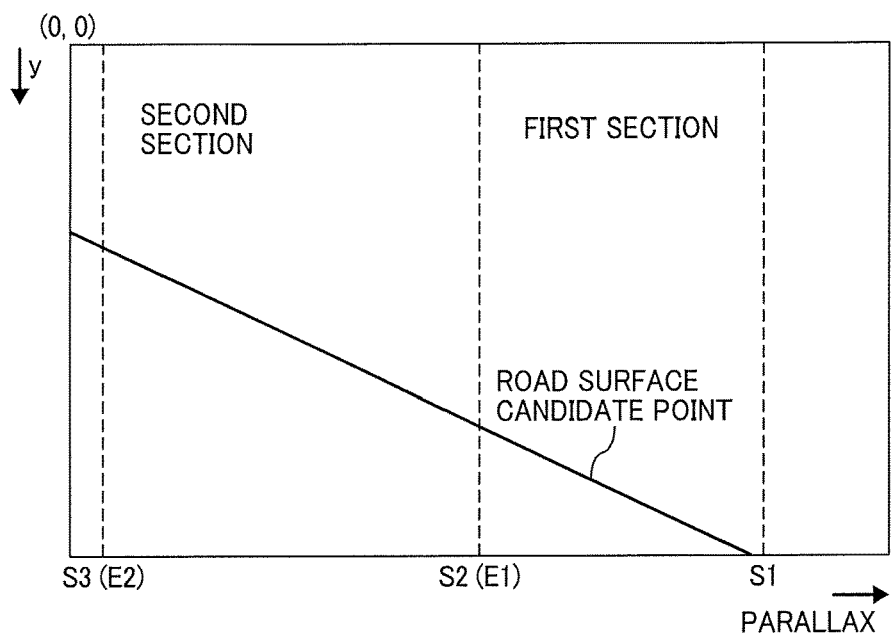
Figure 14A:
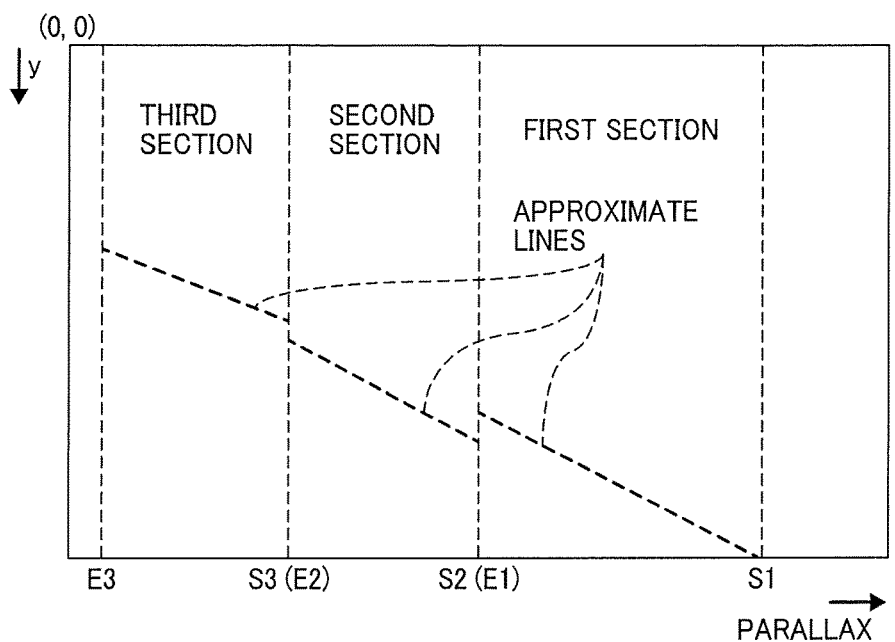
FIG. 14A is a diagram illustrating an example in which the approximate lines of sections obtained are not continuous at section boundaries.
Figure 14B:
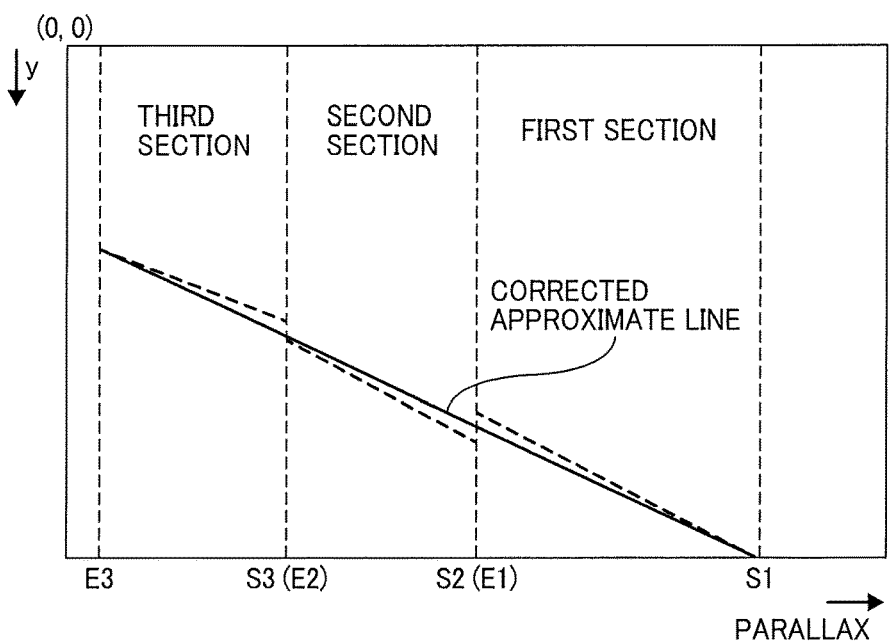
FIG. 14B is a diagram illustrating an example in which the approximate lines of the sections are corrected to be continuous at the section boundaries.

FIG. 11A and FIG. 11B are flowcharts for explaining a division linear approximation process performed by the road surface profile detection unit 136. FIG. 12A and FIG. 12B are diagrams illustrating original sections (FIG. 12A) and sections after the original first section is extended (FIG. 12B). FIG. 13A and FIG. 13B are diagrams illustrating original sections (FIG. 13A) and sections after the original second section is extended (FIG. 13B). FIG. 14A is a diagram illustrating an example in which the approximate lines of sections obtained are not continuous at section boundaries. FIG. 14B is a diagram illustrating an example in which the approximate lines of the sections are corrected to be continuous at the section boundaries.

In the data of an amended V map, the road surface profile detection unit 136 sets up a first section related to the shortest distance and the greatest parallax value (step S91). Next, a road surface candidate point locating in the first section is extracted which is extracted by the sample point extracted unit 134 and not extracted by the unfit point removal unit 135 (step S92).

When the number of the extracted road surface candidate points is less than a predetermined reference number (step S93: NO), the first section is extended by a predetermined parallax value (step S94). Specifically, the original first and second sections as illustrated in FIG. 12A are combined into a single section (the extended first section) as illustrated in FIG. 12B. At this time, the original third section is changed to a new second section. Next, the road surface candidate points within the extended first section are extracted again (step S92) and when the number of the extracted road surface candidate points is greater than the reference number (step S93: YES), the linear approximation process is performed on the extracted road surface candidate points (step S95).

Note that, when extending the section different from the first section, such as the second section, the original second and third sections as illustrated in FIG. 16A are combined into a single section (the extended second section) as illustrated in FIG. 16B.

After the linear approximation process is performed in this way (step S96: NO), reliability evaluation of the approximate line obtained by the linear approximation process is performed. In this reliability evaluation, it is determined whether a slope and an intercept of the obtained approximate line are within predetermined ranges (step S97). When the slope and the intercept are not within the predetermined ranges (step S97: NO), the applicable first section is extended by a predetermined parallax value (step S94), and the linear approximation process is performed again with respect to the extended first section (steps S92 to S95). When the slope and the intercept are within the predetermined ranges (step S97: YES), it is determined whether the section on which the linear approximation process is performed is the first section (step S98).

When it is determined that the linear approximation process is performed on the first section (step S98: YES), it is determined whether a correlation value of the approximate line is greater than a predetermined value (step S99). When the correlation value of the approximate line is greater than the predetermined value (step S99: YES), the approximate line is determined as an approximate line of the applicable first section. When the correlation value of the approximate line is less than the predetermined value (step S99: NO), the applicable first section is extended by the predetermined parallax value (step S94), the linear approximation process is performed again with respect to the extended first section (steps S92 to S95), and the reliability evaluation is performed again (steps S97 to S99). Note that when the linear approximation process is performed on the section different from the first section (step S98: NO), the determination for the correlation value of the approximate line at step S99 is not performed.

Subsequently, it is determined whether there is a next section (step S100). When there is no next section (step S100: NO), the division linear approximation process is terminated by the road surface profile detection unit 136. On the other hand, when there is the next section (step S100: YES), the next section (e.g., the second section) is set up to have a width corresponding to a distance equivalent to the fixed multiple of a distance corresponding to the width of the preceding section (step S101). Subsequently, it is determined whether the set-up section is smaller than the following section (e.g., the third section) for the following setting (step S102). When it is determined that the set-up section is not smaller (step S102: NO), the road surface candidate points within the second section are extracted and the linear approximation process is performed (steps S92 to S95), the reliability evaluation is performed (steps S97 to S99).

In this way, the sections are set up sequentially and the linear approximation process and the reliability evaluation are performed on the sections repeatedly. Alternatively, it is determined at step S102 that the set-up section is smaller than the following section (step S102: YES). In this case, the set-up section is extended to include the following section as the final section (step S103). In this case, the road surface candidate points within the final section are extracted (step S92), and the linear approximation process is performed on the extracted road surface candidate points (step S95). Ultimately, it is determined at step S96 that the processed section is the final section (step S96: YES). Then, the division linear approximation process is terminated by the road surface profile detection unit 136.

Usually, the approximate lines of the sections obtained when the linear approximation process is performed on the sections by the road surface profile detection unit 136, respectively, are not continuous at the section boundaries as illustrated in FIG. 14A. Hence, in this embodiment, the road surface profile detection unit 136 is configured to correct the approximate lines as illustrated in FIG. 14B, so that the approximate lines of the sections illustrated in FIG. 14A are continuous at the section boundaries. Specifically, both the approximate lines are corrected to pass through a middle point between the end points of the approximate lines of the sections at the section boundary.

[Road Surface Height Table Computation]

The road surface height table computation unit 137 is configured to perform a road surface height table computation process which computes a road surface height (a height relative to the road surface portion directly below the vehicle) and generates a road surface height table based on the information on the approximate lines from the road surface profile detection unit 136. The distance to the road surface portion projected on each line area (each position in the image vertical direction) of the captured image is computed based on the information on the approximate lines generated by the road surface profile detection unit 136. On the other hand, it is known beforehand how each surface portion in the vehicle traveling direction of a virtual plane (extended in the vehicle traveling direction to be parallel to the surface of the road surface portion directly below the vehicle) projects on the line areas of the captured image. This virtual plane (reference road surface) is expressed by a straight line (reference line) on the V map. By comparing the approximate line output from the road surface profile detection unit 136 with the reference line, a height of each road surface portion in front of the vehicle is determined. In a simplified method, a height of the road surface portion existing in front of the vehicle at a distance obtained from the corresponding parallax value is computed based on the y-axis direction position on the approximate line output from the road surface profile detection unit 136. The road surface height table computation unit 137 generates a table in which the height of each road surface portion obtained from the approximate line is stored for the required parallax range.

Note that a height of an object from the road surface when the image portion of the object in the captured image corresponds to the point of the y-axis direction position y' for a certain parallax value d is computed by (y'−y0) where y0 denotes the y-axis direction position on the approximate line for the applicable parallax value d. Generally, the height H of the object corresponding to the coordinates (d, y') of the V map from the road surface is computed according to the following formula.

$$H = z \times (y'-y0)/f$$

where "z" denotes the distance (z=BF/(d−offset)) computed from the parallax value d, "f" denotes the value obtained when the focal distance of the camera is transformed into the same unit as the unit of (y'−y0). "BF" denotes the value obtained by multiplication of the base distance and the focal distance of the stereo camera, and "offset" denotes a parallax value when the object of infinity is captured.

[Object Detection Process]

The object detection unit 138 generates two-dimensional histogram information of X-Y (a frequency U map) based on the group (x, y, d) of the x-axis direction position x, the y-axis direction position y, and the parallax value d in each parallax pixel data included in the parallax image data, the x-axis direction position x is set to the x-axis, the parallax value d is set to the y-axis, and the frequency is set to the z-axis.

The object detection unit 138 generates a frequency U map only for the point (x, y, d) of the parallax image having a height H from the road surface in a predetermined height range (e.g., the range from 20 cm to 3 m) based on the height of each road surface portion of the table generated by the road surface height table computation unit 137. In this case, an object existing in the predetermined height range from the road surface may be extracted appropriately.

[Traveling Support Control]

The control unit 139 performs traveling support control of the vehicle 100 to send a notification of warning to the driver of the vehicle 100 and to control the handle and the brakes on the vehicle 100 based on the result of the detection of the objects.

Note that this embodiment explains using the parallax image as the distance image for example. However, the invention is not limited to this example. For example, the distance image may be generated by combining parallax images generated by using a stereo camera to distance images generated by a detection apparatus like a Millimeter-wave radar or a laser radar. The accuracy of detection may be higher by using both a stereo camera and a detection apparatus like a Millimeter-wave radar and a laser radar, and combining the detection apparatus with a detection result by a stereo camera above-mentioned.

The moving object device control system according to the present disclosure is not limited to the above-described embodiments, and various variations and modifications may be made without departing from the scope of the present disclosure.

For example, the functions of the processing hardware unit 120 and the image analysis unit 102 may be implemented by hardware, or may be implemented by any of the elements and devices illustrated in FIG. 2, which are activated by instructions from the CPU (processor) 123 based on the programs stored in the memory 122. The programs may be stored in an installable or executable file format on a computer-readable recording medium, and the recording medium storing the programs thereon may be distributed. Examples of the recording medium include a compact disc recordable (CD-R), a digital versatile disk (DVD), a Blu-ray disc (BD), etc. Further, the recording medium storing the programs thereon, such as a compact disc read only memory (CD-ROM) or a hard disk (HD) may be supplied domestically or overseas as program products.

The below-described hardware description is a non-limiting example of corresponding structure for performing the functions achieved by any one of the algorithms described herein. The hardware description below, exemplified by any of the structure examples constitutes or includes specialized corresponding structure that is programmed or configured to perform the functions and processes described herein.

The hardware elements may be realized by various structural elements as identified by the term "circuitry" which is a known identifier of the structure to those skilled in the art. For example, the hardware elements of a computer utilized to implement the invention may be realized by various circuitry elements, known to those skilled in the art. For example, a CPU or processor of the invention may be a Xenon or Core processor from Intel of America or an Opteron processor from AMD of America, or may be other processor types that would be recognized by one of ordinary skill in the art. Alternatively, the CPU or processor may be implemented on an FPGA, ASIC, PLD or using discrete logic circuits, as one of ordinary skill in the art would recognize. Further, the CPU or processor may be implemented as multiple processors cooperatively working in parallel to perform the instructions of the inventive processes described above.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

What is claimed is:

1. An image processing apparatus comprising:
a processor configured to:
   generate vertical direction distribution data which is a distribution of distance values along a vertical direction to a distance image from the distance image having distance values according to distance of a road surface in captured images obtained by an imaging circuit mounted on a moving object;
   select one coordinate on abscissa axis of coordinates of a map represented by the vertical direction distribution data and set the selected one coordinate as an observation point;
   select a range on the abscissa axis of the coordinate, the range including the observation point;
   set a search area having a width corresponding to the range on the abscissa axis and a height;
   extract a pixel having a highest frequency value for each of the distance values from pixels in the search area;
   detect the road surface based on each pixel extracted; and
   control the moving object based on the detected road surface.

2. The image processing apparatus according to claim 1, wherein
the height of the search area has a value which is greater than or equal to a predetermined value of each of the distance values and is a predetermined height from the lowest pixel in the vertical direction in the vertical direction distribution data.

3. The image processing apparatus according to claim 1, wherein the processor is further configured to:
   calculate an approximate line based on each pixel extracted;
   remove a pixel which is greater than a predetermined distance from the approximate line; and
   detect the road surface based on pixels which have not been removed.

4. The image processing apparatus according to claim 3, wherein the processor is further configured to:
   remove the pixel which is greater than the predetermined distance, the predetermined distance corresponding to a distance of the road surface.

5. An imaging device comprising:
a plurality of imaging circuits mounted on a moving object;

circuitry configured to:
  generate a distance image having distance values according to a parallax of a road surface in captured images obtained by the plurality of imaging circuits;
  generate vertical direction distribution data which is a distribution of distance values along a vertical direction to the distance image;
  select one coordinate on abscissa axis of coordinates of a map represented by the vertical direction distribution data and set the selected one coordinate as an observation point;
  select a range on the abscissa axis of the coordinate, the range including the observation point;
  set a search area having a width corresponding to the range on the abscissa axis and a height;
  extract a pixel having a highest frequency value for each of the distance values from pixels in the search area;
  detect the road surface based on each pixel which has been extracted; and
  control the moving object based on the detected road surface.

6. A moving object device control system comprising:
a plurality of imaging circuits mounted at a moving object which captures images of a forward area of the moving object;
circuitry configured to:
generate a distance image having distance values according to a parallax of a moving surface or a road surface in captured images obtained by the plurality of imaging circuits;
generate vertical direction distribution data which is a distribution of distance values along vertical direction to the distance image;
select one coordinate on abscissa axis of coordinates of a map represented by the vertical direction distribution data and set the selected one coordinate as an observation point;
select a range on the abscissa axis of the coordinate, the range including the observation point;
set a search area having a width corresponding to the range on the abscissa axis and a height;
extract a pixel having a highest frequency value for each of the distance values from pixels in the search area; and
detect the moving surface or the road surface based on each pixel which has been extracted;
detect an object based on the moving surface detected or the distance image; and
control the moving object based on data of the object which has been detected.

7. An image generation method, comprising:
generating vertical direction distribution data which is a distribution of distance values along a vertical direction to a distance image from the distance image having distance values according to distance of a road surface in captured images obtained by an imaging circuit mounted on a moving object;
selecting one coordinate on abscissa axis of coordinates of a map represented by the vertical direction distribution data and setting the selected one coordinate as an observation point;
selecting a range on the abscissa axis of the coordinate, the range including the observation point;
setting a search area having a width corresponding to the range on the abscissa axis and a height;
extracting a pixel having a highest frequency value for each of the distance values from pixels in the search area;
detecting the road surface based on each pixel extracted; and
controlling the moving object based on the detected road surface.

* * * * *